(12) United States Patent
Novak

(10) Patent No.: US 7,014,934 B2
(45) Date of Patent: Mar. 21, 2006

(54) TUBULAR FLAT PLATE FUEL CELLS AND METHOD OF MAKING THE SAME

(75) Inventor: Robert F. Novak, Farmington Hills, MI (US)

(73) Assignee: Ford Motor Company, Dearborn, MI (US)

( * ) Notice: Subject to any disclaimer, the term of this patent is extended or adjusted under 35 U.S.C. 154(b) by 380 days.

(21) Appl. No.: 10/249,134

(22) Filed: Mar. 18, 2003

(65) Prior Publication Data

US 2004/0185318 A1    Sep. 23, 2004

(51) Int. Cl.
*H01M 8/12* (2006.01)
*H01M 2/08* (2006.01)

(52) U.S. Cl. .......... 429/32; 429/35; 264/618; 264/642

(58) Field of Classification Search ........ 429/31, 429/32, 35, 36; 264/618, 642
See application file for complete search history.

(56) References Cited

U.S. PATENT DOCUMENTS

| | | | |
|---|---|---|---|
| 4,476,196 A | * | 10/1984 | Poeppel et al. ........... 429/32 |
| 4,997,727 A | | 3/1991 | Bossel |
| 5,185,219 A | * | 2/1993 | Ishihara et al. ........... 429/31 |
| 5,308,469 A | | 5/1994 | Aldinger et al. |
| 5,356,728 A | * | 10/1994 | Balachandran et al. ... 429/31 X |
| 5,368,667 A | | 11/1994 | Minh et al. |
| 5,532,071 A | * | 7/1996 | Pal et al. ................. 429/36 X |
| 5,786,105 A | | 7/1998 | Matsushima et al. |
| 6,004,644 A | * | 12/1999 | Takeuchi et al. ......... 264/618 X |
| 6,361,893 B1 | | 3/2002 | George et al. |
| 6,423,436 B1 | | 7/2002 | George et al. |
| 6,849,353 B1 | * | 2/2005 | Vora et al. ................ 429/31 |

* cited by examiner

*Primary Examiner*—Stephen J. Kalafut
(74) *Attorney, Agent, or Firm*—Damian Porcari

(57) ABSTRACT

A solid oxide fuel cell employs an array of tubular flat plates that are sealed only at their extremities using compliant seals. The seals may be formed of talc and surround gas inlet and outlet openings in the tube extremities. Locating the seals remote from the higher temperature central areas of the tubes increases the service life of the seals and their tolerance to thermal cycling. The seals may incorporate an annular conductor for electrically interconnecting adjacent tubes into a common circuit.

34 Claims, 4 Drawing Sheets

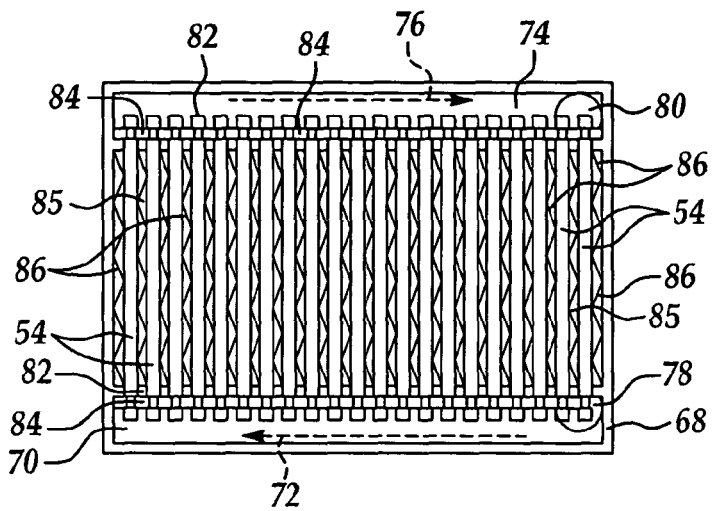
*Figure 13*
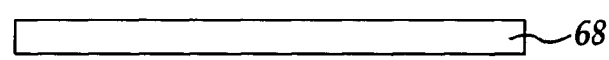
*Figure 14*
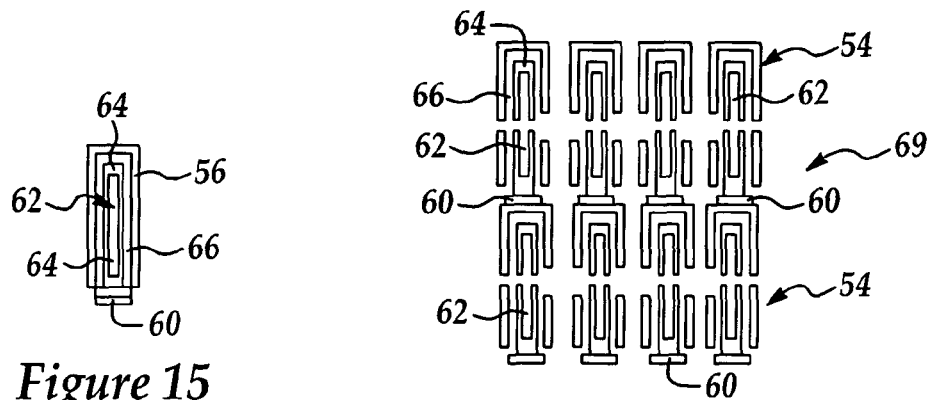
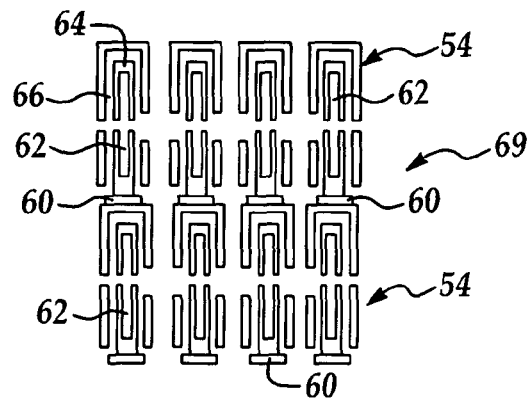
*Figure 15*
*Figure 16*
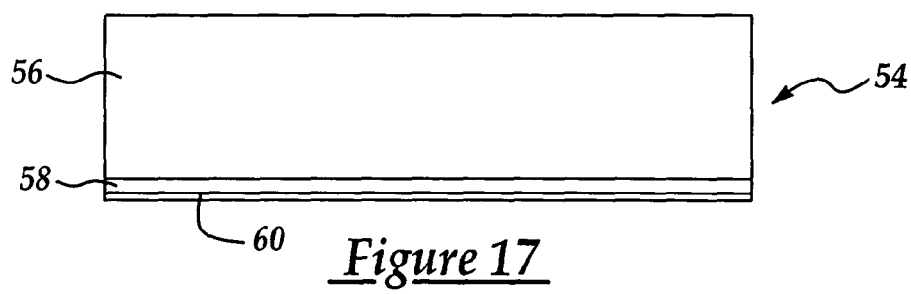
*Figure 17*

TUBULAR FLAT PLATE FUEL CELLS AND METHOD OF MAKING THE SAME

BACKGROUND OF INVENTION

1. Field of the Invention

This invention generally relates to electrochemical devices such as fuel cells, and relates more particularly to improvements in solid oxide fuel cells (SOFCs) of the flat plate design, as well as methods for manufacturing the cells.

2. Background of the Invention

Fuel cells are electrochemical energy conversion devices that generate electricity and heat by converting the chemical energy of fuels. Solid-oxide fuel cells (SOFCs) are made from solid-state materials, such as ceramic oxide. SOFCs consist of three components: a cathode, anode, and an electrolyte sandwiched between the cathode and anode. Oxygen from the air is reduced at the cathode and is converted into negatively charged oxygen ions. These ions travel through the electrolyte to the anode, where they react with fuel, such as hydrogen. The fuel is oxidized by the oxygen ions and releases electrons to an external circuit, thereby producing electricity. The electrons then travel to the cathode, where they release oxygen from air, thus continuing the electricity-generating cycle. Individual cells can be stacked together in series to generate larger quantities of electricity.

Generally, SOFCs that employ planar cell units present design challenges because of a need to separate the air from the fuel by a seal substantially around the entire edge of the ceramic fuel cell plate. Also, the interconnection of stacks in a fuel cell assembly is made difficult because of the relatively high operating temperatures of SOFC which have ceramic, rather than metallic interconnects. Metallic interconnections are subject to oxidation, which leads to a loss of conductivity. Finally, the high operating temperature of SOFCs presents a further design challenge from the standpoint of the mechanical integrity of the fuel cell stack. When brought up to operating temperature and then back to room temperature, the fuel cell stack experiences dramatic thermal and mechanical stresses, which can lead to mechanical fatigue and failure, particularly where the fuel cells must be thermally cycle many times. The design problems discussed above are exacerbated when SOFCs are used in automotive applications such as auxiliary power units (APU) for vehicles. The automotive environment is particularly challenging and demanding, compared to the use of SOFCs in stationary applications, because of the need for higher power densities dictated size constraints, impact on fuel economy and emissions, crash worthiness, and deep thermal cycling over many cycles of use.

Several configurations for SOFCs have been developed, including monolithic, planar and tubular. The monolithic SOFC design is characterized by a honeycomb construction that is fused together into a continuous structure. Planar stacks, which have good energy densities, suffer from the fact that they require large perimeter seals around the entire edges of the ceramic fuel cell plates. Neither of these design elements lend themselves to rapid or uneven thermal cycling. Planar stacks need long, slow heat up cycles which is inconsistent with automotive applications where SOFCs are called upon to operate "on demand". Tubular SOFCs require sealing only at the ends of the tubes over a relatively small area. The tubular seals are therefore distant from the hottest area of the fuel cell stack, consequently tubular SOFCs can be thermally cycled faster, and for more cycles. Unfortunately, tubular SOFCs exhibit markedly lower power per unit volume, compared to flat plate SOFCs, because their physical geometries do not allow high density, close stacking of the individual tubular units.

Accordingly, there is a clear need in the art for improved SOFCs that exhibit exceptionally high power per unit volume, which can not only withstand stresses stemming from deep thermal cycling over many cycles of use.

SUMMARY OF INVENTION

A primary object of the invention is to provide an SOFC that exhibits high power density, but is not subject to performance deterioration due to deep thermal cycling over many cycles of use. In accordance with a preferred embodiment of the invention, a fuel cell assembly includes a plurality of flat tubes arranged in parallel, spaced relationship, each having first and second anode-electrolyte-cathode surfaces. The tubes are sealed only at their outer extremities, thereby reducing the total sealing area and placing the seal distance from the higher temperature, central areas of the tubes. The seals, which isolate the fuel gas from the air, are preferably in the form of annular, compliant members formed of talc that surround through holes in the ends of the tubes which allow fuel gas to enter and exit the tubes. An annular, compliant conductor may be incorporated into the talc seal member in order to electrically connect adjacent tubes. Tolerance of deep thermal cycling can be improved by employing the compliant seal members only at the gas outlet ends of the tubes, and using noncompliant seals at the inlet of the tubes using long flat tubes with seals outside of the hot zones.

In accordance with another important object of the invention, in a preferred embodiment, a method is provided for making a flat fuel cell tube assembly, comprising the steps of forming an open ended tube by sintering two strips of uncured ceramic forming the sides of the tube, and sealing only the ends of the tube using compliant seals. One or more gas passageways within the tubes may be formed using a fugitive material as a filler which is burned out during the sintering process, or by laminating the ceramic strips in a shallow cavity bowl.

An advantage of the present tubular flat plate fuel cell is that the area of tube requiring sealing is substantially reduced, thereby making the fuel cell suitable for use in applications requiring higher operating temperatures. A related advantage is that the seals are located distant from central portions of the tube which experience higher operating temperatures that are otherwise deleterious to the seals.

An added advantage of the invention is that the seals are preferably made of compliant material allowing thermal and mechanical expansion of the fuel cell components during thermal cycling. A still further advantage of the invention is that the tubes can be manufactured using commonly available materials and well proven production techniques.

These and other features and advantages of the present invention may be better understood by considering the following details of a description of a preferred embodiment of the invention. In the course of this description, reference will frequently be made to the attached drawings.

BRIEF DESCRIPTION OF DRAWINGS

FIG. 13 a plan view of a fuel cell module employing a flat fuel cell tube according to an alternate embodiment of the invention, the cover of the module having been removed for clarity;

FIG. 14 is a side elevational view of the fuel cell shown in FIG. 13;

FIG. 15 is an enlarged, cross sectional view of one of the flat tubes used in the fuel stack shown in FIG. 13;

FIG. 16 is a view similar to FIG. 15 but showing a plurality of the tubes in stacked, interconnected relationship; and, FIG. 17 is a side elevational view of the fuel cell tube shown in FIG. 15.

DETAILED DESCRIPTION

Figure 1:
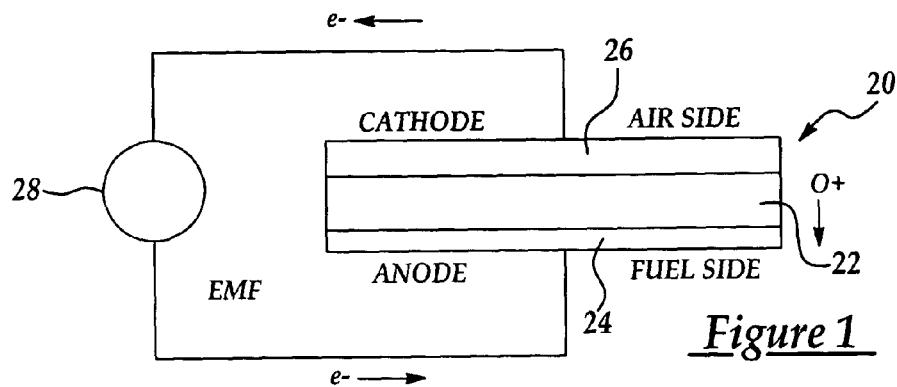
FIG. 1 is a combined schematic and diagrammatic view showing the basic operation of a solid oxide fuel cell.
Figure 2:
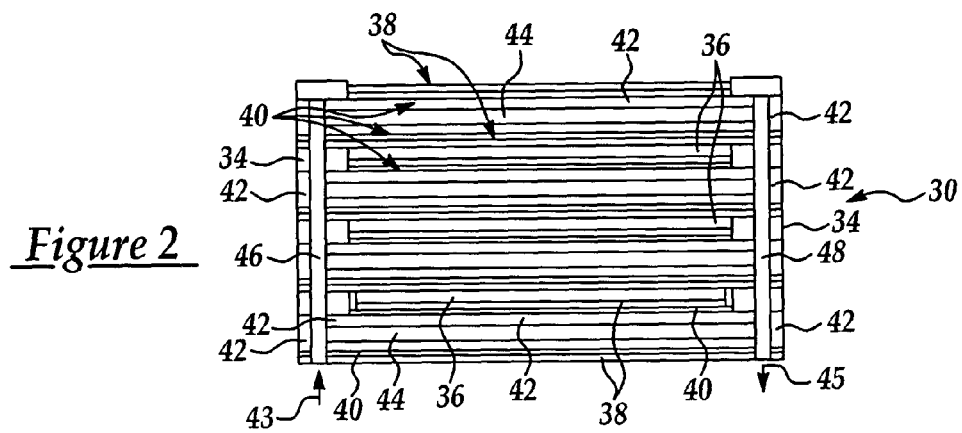
FIG. 2 is diagrammatic, side view of a fuel cell stack forming the preferred embodiment of the present invention, and the depicting individual layers of each flat tube and gas passageways for carrying fuel gas through the tubes.
Figure 3:
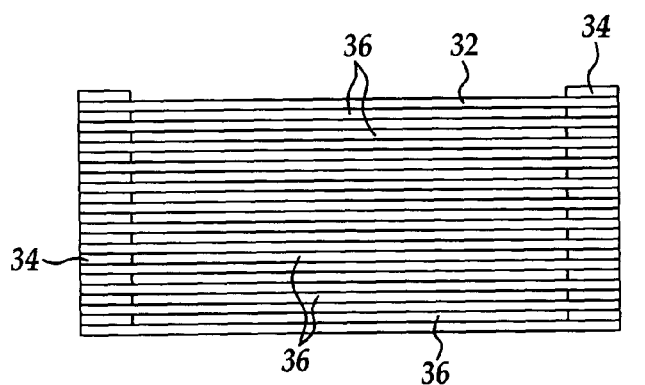
FIG. 3 is a side view of the fuel cell stack shown in FIG. 2.
Figure 4:
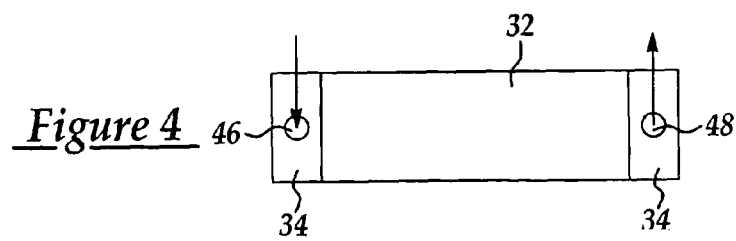
FIG. 4 is a plan view of one of the tubes forming part of the fuel cell stack of FIGS. 2 and 3.
Figure 5:
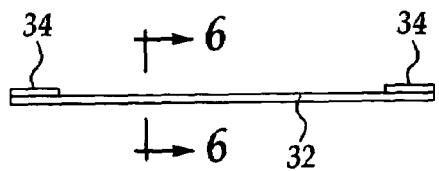
FIG. 5 five is a side view of the tubes shown in FIG. 4.

Referring first to FIG. 1, the present invention relates to improvements in solid oxide fuel cells (SOFCs) whose fundamental operation is well known in the art. An SOFC, generally indicated by numeral 20 comprises an electrolyte 22 sandwiched between an anode 24 and a cathode 26. A first process gas, such as the oxygen contained in air is exposed to and reduced at the cathode 26, while a second process gas, such as hydrogen, is exposed to the anode 24. The oxygen reduced at the cathode 26 is converted into negatively charged oxygen ions which travel through the electrolyte 22 to the anode 24 where they react with the hydrogen fuel gas. The fuel gas is oxidized by the oxygen ions and releases electrons to an external circuit where they produce an electromotive force or voltage indicated by the voltmeter 28. The electrons then travel to the cathode 26 where they reduce oxygen from the air, thus continuing the electricity-generating cycle. A plurality of the fuel cells 20 may be stacked together and connected in series to supply larger quantities of electricity.

Reference now made to FIGS. 2–6 which show the details of flat tube fuel cells according to the preferred embodiment of the invention, arranged in a fuel cell stack generally indicated by the numeral 30. The fuel cell stack 30 includes a plurality of stacked, flat tube fuel cells 32 which are held in parallel, compressed relationship by any suitable clamping or mounting means (not shown), and are typically surrounded by a protective housing (not shown). The flat tubes 32 are held in spaced relationship to each other by spacers 34, to create a series of gas flow channels 36 between the opposed, facing sides of the tubes 32. The fuel cell stack 30 is of a so-called cross flow or orthogonal flow type, in which the first and second process gases flow in orthogonal directions. In the present example, a first process gas, such as hydrogen fuel, flows longitudinally through later discussed gas passageways in the tubes 32, while a second process gas such as air flows through the gas flow channels 36, in a direction transverse to the flow of gas through the tubes 32.

Each of the flat tubes 32 includes one or more internal, longitudinal gas flow passageways 44 that extend substantially throughout its entire length. The passageways 44 are formed within the body of an anode 42 having its opposite flat sides covered by a layer of solid oxide electrolyte 40. Both sides of the electrolyte 40 are covered with a cathode 38, so that each of the flat tubes 32 possesses first and second anode-electrolyte-cathode surfaces, wherein the anode 42 is contacted by the first process gas, and the cathode 38 is contacted by the second processed gas.

Each of the flat tubes 32 includes a first transversely extending through hole 46 forming a gas inlet in one end of the tube, and a second transversely extending through hole 48 forming a gas outlet in the opposite end of the tube 32. Similar through holes are formed in the spacers 34, coaxial with the through holes 46, 48. As best seen FIG. 2, the inlet and outlets 46, 48 respectively communicate with the opposite ends of the gas passageway 44 in the tube 32. The aligned openings 46, 48 in the tubes 32 and those formed in the spacers 34 create a delivery channel 46 which delivers the first process gas from a source indicated by the arrow 43, to the inlet sides of the passageways 44. Similarly the aligned through holes 48 create an exhaust channel 48 which carries first process gas from the outlet ends of the passageways 44 to a stack exhaust indicated by the arrow 45.

Figure 6:
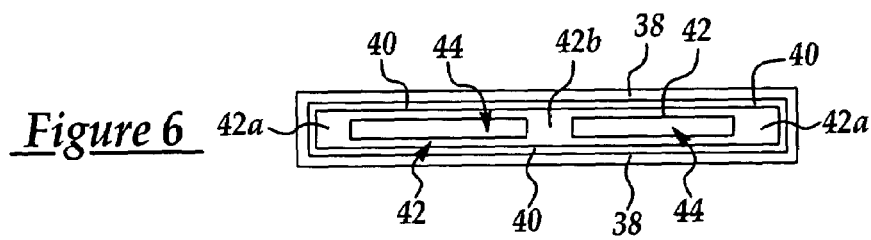
FIG. 6 is enlarged, cross sectional view taken through line 6—6 in FIG. 5.

As shown in FIG. 6, depending upon the method of manufacture and the size of the tubes 32, the anode 42 may be formed with one or more internal support walls 42B, which together with sidewalls 42A, divide the gas passageway 44 into multiple flow channels. The support walls 42B function to prevent the collapse of the tubes during their manufacture.

Figure 7:
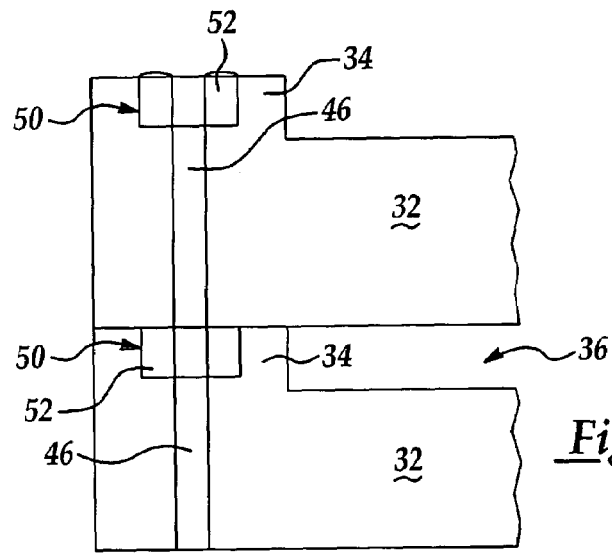
FIG. 7 is an enlarged, fragmentary, cross sectional view taken through one side of the fuel cell stack of FIGS. 2 and 3, depicting more clearly the compliant seals.

In accordance with the present invention, the gas inlet and outlet openings 46, 48 are sealed by means of annularly shaped, compliant seals 52 (FIG. 7) which may be formed from a compliant material such as talc or mica. The talc used in the seals 52 may have an average grain size of about 0.5 to about 10.0 micrometers and will have a sufficient thickness so that when the tubes 32 are compressed together in a stack, the talc will seal the voids in the opposing, clamped surfaces of the tubes 32, creating a gas tight seal therebetween. The seals 52 may be preformed under low compression in a suitable mold. Although the seals 52 may be interposed directly between the facing surfaces of a spacer 34 and a cathode surface of the joining tube plate 32, it is preferred that they be placed within cylindrically shaped recesses 50 formed in the spacers 34, coaxial with the corresponding delivery channel 46, 48. By placing the seals 52 within the recesses 50, the sides of the talc seal are restrained which tends to prevent lateral deformation of the seal, thereby improving the sealing quality.

Figure 8:
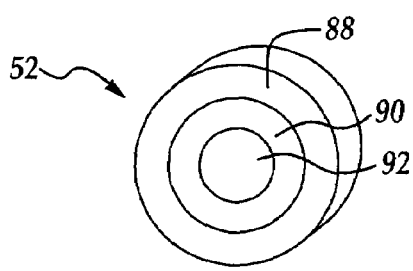
FIG. 8 a perspective view of the one of the compliant seals of FIG. 7.
Figure 9:
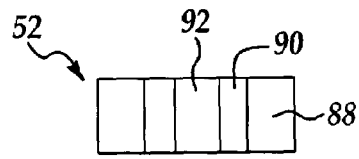
FIG. 9 is a cross sectional view of the compliant seal shown in FIG. 8.

An alternate embodiment of the talc seal 52 is shown in FIGS. 8 and 9. As an additional feature, a compliant, cylindrically shaped metal conductor 90 formed of copper, for example, is concentrically disposed within an outer talc body 88. The conductor 90 forms an electrical interconnect that extends the entire length of the seal 52 and has a central opening 92 therein to allow the first process gas to flow therethrough. One end of the interconnect conductor 90 contacts an anode 42 and the opposite end contacts a cathode 38 of an adjoining tube 32, thereby electrically connecting the tubes 32 in series relationship to each other.

In those cases where higher operating temperatures and deep thermal cycling are encountered in the fuel cell, it may be desirable to use the talc seals 52 only at the outlet openings 48, where the temperature of the first process gas is lower than at the inlet openings 46. In this case, noncompliant seals such as those made from glass beads, may be used to seal the inlet openings. The noncompliant seals are better suited to create an effective seal at the inlet openings 46 where the gas pressure is higher than at the outlet openings 48. Even though the noncompliant seals do not expand and contract with temperature, the use of compliant seals at the outlet opening allows the entire assembly to expand and contract with temperature.

Reference is now made to FIGS. 13–17 which depict a flat fuel cell tube and fuel cell stack forming an alternate embodiment of the present invention. The fuel cell tube 54 has a flat, tubular anode 64 which, like the previously described embodiment, possesses an internal, longitudinally extending passageway 62 through which a first process gas may flow. A layer of solid oxide electrolyte 66 is formed over both flat sides of the anode 64. A cathode 56 formed over the electrolyte 66, and as best seen in FIGS. 15 and 17, extends downwardly, but not completely over the sides of the tube 54, so as to leave a strip 58 of the electrolyte 66 exposed. The exposed strip of electrolyte 58 forms a reaction area since it is exposed to the second process gas flowing over the exterior surfaces of the tube 54. An electrically conductive strip 60 is formed on the bottom of the tube 54. As shown in FIG. 16, the conductive strip 60 is used to interconnect two stacks of 69 of the fuel cells. Specifically, the conductive strips 60 connect the anodes 64 of the upper stack with the cathode 56 of the stacks therebeneath.

In contrast to the previously described preferred embodiment in which adjacent tubes are interconnected by transverse through holes in the tubes, the flat tubes 54 do not possess such through holes, but rather have their ends open, forming gas inlets and outlets.

As seen in FIG. 13, a fuel cell module is formed by interconnecting a plurality of the flat tubes 54 within a gas tight housing 68. The housing 68 includes a gas inlet 78 coupled with a suitable source of fuel gas, such as hydrogen, and a gas outlet 80. Gas received through the inlet 78 passes through a first plenum 70 in the direction of the arrow 72. The plenum 70 distributes the gas to the inlet openings in the ends of the tubes 56. The gas exiting the tubes 54 at the outlet ends are collected in a second plenum 74 which directs the gas in the direction of arrow 76 to the gas outlet 80. The flat tubes are held in parallel, spaced apart relationship by means of talc seals 84 and insulators 82, each of which extends the entire height of the tube 56. The talc seals 84 create a seal between the gas flow channels 85 between adjacent tubes, and the gas plenums 70, 74. Insulators 82 function to thermally isolate the seals 84 from the higher temperatures generated toward the middle of the tubes 54. The insulators 82 may be formed of alumina zirconia fiberboard, and also act as spacers to maintain the spacing between adjacent tubes 54. A waffle like current collector 86 formed, for example of gold plated stainless steel, is disposed between and electrically interconnects the cathodes of adjoining tubes 54. The current collectors 86 electrically connect the tubes in each stack in parallel relationship to each other, and also function to help distribute heat more uniformly over the stack.

The component parts of the previously described flat tubes are manufactured using commonly available materials and proven manufacturing techniques involving tapecasting, screen printing and lamination. These manufacturing techniques allow close control over the thickness of anodes, the electrolyte and the cathodes. The flat tubes are formed of green ceramic tape which may be composed of 40–60 wt % NiO, 60–40 wt % fully stabilized $ZrO_2$ (stabilized by 13 wt % $Y_2O_3$) in the blend), pore formers of rice starch or others, a binder such as polyvinyl butyual, and a plasticizer such as Di (propyleneglycol)dibenzoate. The method for manufacturing green ceramic tape is well known in the art and therefore need not be described in detail herein. Briefly, however, the green tape is manufactured by mixing milled powders of a desired particle size with solvents, binders and plastizers to form a slurry which is then spread on a moving Mylar carrier using a "doctor blade" to achieve a film thickness of between 50 and 400 microns. The moving carrier continues slowly down an enclosed casting table for several hundred feet, passing through a number of controlled rate drying stages. Volatilization of the solvents stabilizes the solidifying dispersion. The tape emerges from the table dry and ready for blanking or cutting into sheets.

The next step involves screen printing a thin paste layer of $ZrO_2$ with 8 mole % $Y_2O_3$ unto the surface of the tape. This printing is performed using a stainless steel screen, the thickness of which controls the thickness of the wet paste. The film applied with this process may have a thickness of between 3 and 40 microns. Multiple coatings of the same or different materials may be deposited. The tape and the coating must be dried after each printing. The flexible green tape having the desired patterns printed thereon is then cut to size with a hot knife or shear.

There are several methods for forming the tape into the shape of a desired flat tube. One method of forming the tube consists of stencil printing a fugitive layer of material on one side of one strip of dried tape, consisting of a mixture carbon black and organic binders; the fugitive layer is printed on a side of the tape opposite of the side containing the layer of $ZrO_2$. Next, a second strip of tape having a layer of $ZrO_2$—$Y_2O_3$ layer on one side there of is laminated to the first ceramic strip, with the stencil printed fugitive layer sandwiched between the two strips, in a heated press, where lamination is performed at 90° C. and a pressure of 3,000 psi. Following lamination, the formed tubes are placed in an oven at a temperature that is sufficient to incinerate the fugitive material so as to leave an internal passageway within the tube.

A second method for forming the tubes consists of cutting a piece of the green tape into thin strips and then screen printing thereon a layer of the Zirconia composite ink in the shape that the strips will form, and then laying them onto the wet ink. A second printing is performed with the same pattern on top of the strips and another of tape is added to form the tube. The composite piece is then dried.

A third method of forming a tube consists of pre-forming the tape in a shallow cavity mold heated to a temperature of 80 to 100° C., and then printing a binder on the raised edges of the tape. Then, a second strip of green tape is laminated on top of the first piece to form the tube. Through holes may be punched and trimming may be performed before the tubes are fired.

Figure 10:
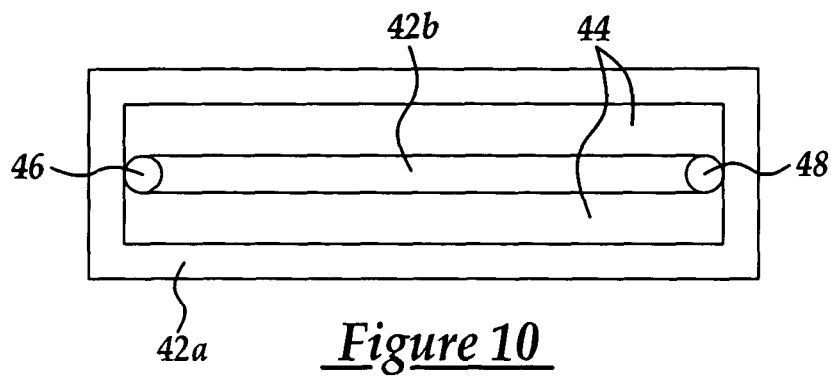
FIG. 10 is a plan view of one strip of ceramic tape forming part of the flat tube shown in FIG. 5.
Figure 11:
FIG. 11 is a plan view of another strip of ceramic tape before being bonded to the strip shown in FIG. 10.
Figure 12:
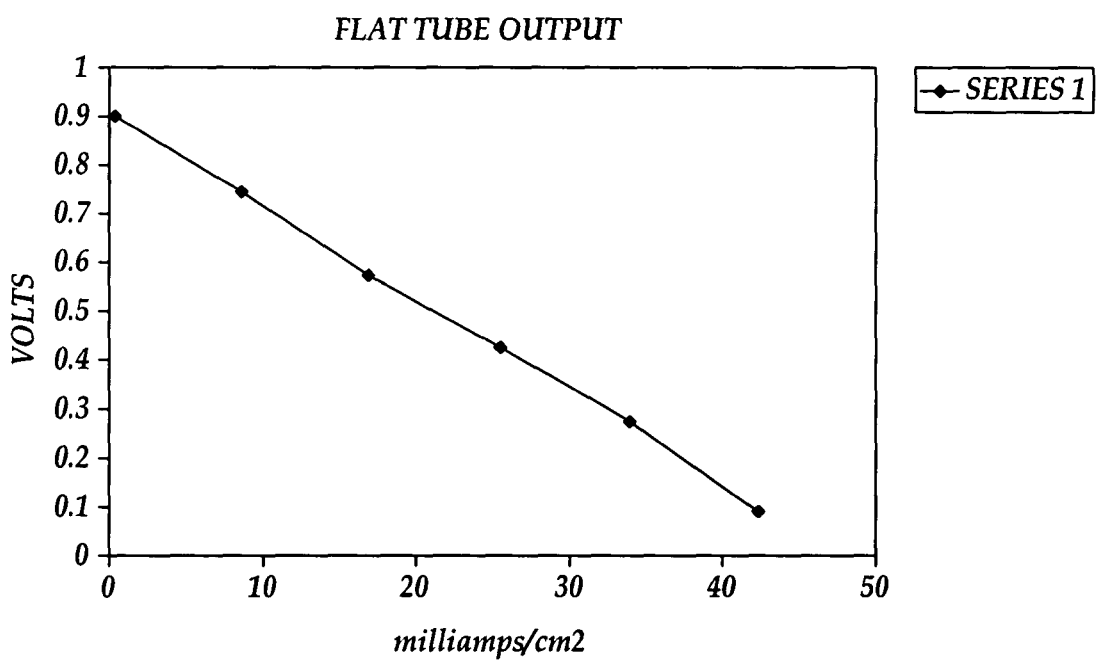
FIG. 12 is a graph showing the electrical performance of a fuel cell according to the preferred embodiment.

FIG. 10 shows a strip of green tape to which there has been applied a patterned layer of material that forms a perimeter side wall 42A and a central support wall 42B of the tube shown in FIG. 6. FIG. 11 shows a second strip of tape that is applied over the patterned strip of FIG. 10 to form the fully assembled tube.

Regardless of the manufacturing technique used above, the formed tubes are then placed into an oven and cured at a temperature of between 1400 and 1500° C. The tubes are then coated with a suitable cathode material of the lanthanum perovskite family ($ABO_3$) and then refired to a lower temperature of between 900 and 1000° C. In the case of the alternate embodiment of the flat tube shown in FIGS. 13–17, one longitudinal edge of the tubes are left uncovered by the $ZrO_2$ electrolyte. This edge is then covered by a layer of nonporous conductive material which as previously described, is exposed to the first and second process gases on its opposite sides. The nonporous conductor may be of the lanthanum chromate family or a layer of a metal such as platinum, gold or titanium nitride. This interconnecting conductor is not a structural element and therefore may be applied as a composite material and co-fired with either the tube during the initial sintering step or when the cathode is fired on or sputtered or painted.

The tubes having been formed as described above, are then assembled with the talc seals positioned therebetween surrounding the gas inlet and outlet openings in the ends of the tube. The tubes and seals are clamped together by any suitable means and installed in an appropriate enclosure such as a stainless steel house.

From the forgoing, it may appreciated that the tubular flat plate fuel cells and method of making the same described above not only provides for the reliable accomplishment of the objects of the invention but do so in a particularly effective and economical manner. It is recognized, of course, that those skilled in the art may make various modifications or additions chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

The invention claim is:

1. A fuel cell assembly, comprising:
   a plurality of flat tubes each having first and second anode-electrolyte-cathode surfaces, an interior passageway through which a first process gas may flow over said first surface, a gas inlet opening at one extremity thereof for allowing said first process gas to enter said passageway, and a gas outlet opening at the opposite extremity thereof for allowing said first process gas to exit said passageway,
   said tubes being arranged in parallel, spaced apart relationship to each other with gas flow channels therebetween for directing a flow of a second process gas over said second surface of said tubes;
   a gas tight seal on each of the opposite extremities of said tubes adjacent each of said inlet and said outlet openings for sealing said tube extremities from said gas flow channels; and
   wherein each of said tubes includes a through hole in at least one extremity thereof, said at least one through hole communicating with at least one of said gas inlet opening and said gas outlet opening.

2. The fuel cell of claim 1, wherein each of said seals includes an outer compliant seal portion and an inner compliant conductor for electrically interconnecting adjacent ones of said tubes.

3. The fuel cell of claim 1, wherein each of said tubes includes an electrical connector along one longitudinal edge thereof.

4. The fuel cell of claim 1, wherein each of said tubes includes at least two parallel layers of sintered ceramic tape.

5. A fuel cell assembly, comprising:
   a plurality of flat tubes each having first and second anode-electrolyte-cathode surfaces, an interior passageway through which a first process gas may flow over said first surface, a gas inlet opening at one extremity thereof for allowing said first process gas to enter said passageway, and a gas outlet opening at the opposite extremity thereof for allowing said first process gas to exit said passageway,
   said tubes being arranged in parallel, spaced apart relationship to each other with gas flow channels therebetween for directing a flow of a second process gas over said second surface of said tubes;
   a gas tight seal on the opposite extremities of said tubes adjacent said inlet and said outlet openings for sealing said tube extremities from said gas flow channels; and
   wherein:
   each of said tubes includes first and second through holes in said opposite extremities thereof, said through holes respectively communicating with said inlet opening and said outlet opening, and
   said seal includes a annular seal member surrounding each of said first and second through holes, each of said seal members being disposed between and abutting opposing surfaces of adjacent ones of said tubes.

6. The fuel cell of claim 5, wherein the seal members surrounding at least one of said first and second through holes are formed of a material selected from the group consisting of talc and mica.

7. The fuel cell of claim 6, wherein the seal members surrounding one of said first and second through holes are formed of a compliant material, and the seal members surrounding the other of said first and second through holes is formed of a noncompliant material.

8. The fuel cell of claim 5, wherein at least certain of said tubes include spacers formed on said opposite extremities for holding said tubes in spaced apart relationship to each other, and said first and second through holes respectively pass through said spacers.

9. The fuel cell of claim 8, wherein each of said spacers includes a recess for receiving one of said annular seal members therein.

10. The fuel cell of claim 5, wherein said gas tight seal includes a plurality of seals disposed respectively between and extending substantially the entire height of said tubes, each of said seals sealing an extremity of a tube from an adjacent one of said gas flow channels.

11. The fuel cell of claim 10, including a first gas plenum for delivering said first process gas to the gas inlet openings, and a second gas plenum for collecting said first process gas from the outlet openings.

12. For use in a fuel cell assembly, a fuel cell, comprising:
    at least two flat tubes each having a closed, continuous body and first and second anode-electrolyte-cathode surfaces, each of said tubes further having a longitudinal, interior passageway through which a first process gas may flow over said first surface, a gas inlet opening at one extremity of said tube for allowing said first process gas to enter said passageway, and a gas outlet opening at the opposite extremity of said tube for allowing said first process gas to exit said passageway;
    said tubes being spaced apart to define a gas flow channel therebetween through which a second process gas may flow over said tubes; and,
    a first gas tight seal between said tubes for sealing said gas inlet opening from said gas flow channel; and
    wherein said tubes each includes a first through hole in one extremity thereof, said first through hole communicating with said inlet opening, and said first seal includes a first annular seal member surrounding said first through hole engaging opposite faces of said tubes.

13. The fuel cell of claim 12, including a second gas tight seal between said tubes for sealing said gas outlet opening from said gas flow channel.

14. The fuel cell of claim 13, wherein:
each of said tubes includes a second through hole in the opposite extremity thereof, said second through hole communicating with said outlet opening, and
said second seal includes a second annular, compliant seal member surrounding said second through hole and engaging opposite faces of said tubes.

15. The fuel cell of claim 14, including first and second spacers for holding said tubes in spaced apart relationship to each other, and wherein said first and second through holes respectively pass through said first and second spacers.

16. The fuel cell of claim 12, wherein said first seal is formed of glass beads.

17. The fuel cell of claim 16, wherein at least one of said first and second seals is annular in shape and includes a compliant electrical conductor therein for making an electrical connection between said tubes.

18. The fuel cell of claim 17, wherein said conductor is annular in shape and defines a conduit through which said first process gas may flow between said tubes.

19. A method of making a flat fuel cell tube, comprising the steps of:
(A) placing two strips of uncured ceramic tape in face-to-face contact;
(B) forming a longitudinal gas flow passageway between said strips; and,
(C) bonding said strips together by temperature-induced curing of said strips; and,
(D) forming at least one through hole transversely through said tube body in at least one end of said tube body and intersecting said passageway.

20. The method of claim 19, wherein step (A) includes laminating said strips together under pressure.

21. The method of claim 19, including the step of applying a layer of electrolyte material to opposing faces of each of said strips.

22. The method of claim 21, wherein said electrolyte material includes $ZrO_2$.

23. The method of claim 19, wherein step (B) is performed by:
applying a layer of fugitive material on the face of at least one of said strips, and
heating said tube body to a temperature sufficient to incinerate said fugitive layer and thereby create a void defining said passageway.

24. The method of claim 19, wherein step (B) is performed by:
placing a first one of said strips in a mold cavity,
heating the first strip to a temperature sufficient to cause the strip to conform to the shape of the cavity,
applying a binder to the edges of at least one of said strips, and
laminating the second one of said strips to said first strip.

25. The method of claim 24, wherein said first strip is heated to a temperature of between 80 and 100 degrees C.

26. The method of claim 19, wherein step (C) is performed by sintering said tube body to a temperature of between 1400 and 1500 degrees C.

27. The method of claim 26, including the steps of:
applying a coating of cathode forming material to outside surfaces of said tube body, and
heating said tube body to a temperature of between 900 and 1200 degrees C.

28. The method of claim 27, wherein the cathode forming material is a lanthanum-based perovskite.

29. The method of claim 19, including the step of forming an electrical interconnect on said tube body by applying a layer of electrically conductive material along one edge of said tube body.

30. The method of claim 19, wherein said tape is 60–40 wt % NiO and 40–60 wt % $ZrO_2/Y_2O_3$ (13 wt % of $Y_2O_3$ in the blend).

31. The method of claim 19, wherein said forming at least one through hole comprises the step of forming first and second through holes transversely through said tube body respectively at the opposite ends of said tube body and intersecting said passageway.

32. The method of claim 19, including the step of forming a cathode on said fuel cell tube by applying a layer of electrically conductive material over flat sides of said tube body.

33. A solid oxide fuel cell comprising:
a flat tube having a first and second anode-electrolyte-cathode surface;
an interior passageway through which a first process gas may flow over said first surface;
a gas inlet opening at one extremity thereof for allowing said first process gas to enter said passageway;
a gas outlet opening at the opposite extremity thereof for allowing said first process gas to exit said passageway; and
at least one through hole extending through said tube and communicating with said passageway.

34. A fuel cell stack comprising:
a plurality of flat tubes arranged in parallel, spaced-apart relationship to each other with gas flow channels therebetween for directing a flow of a process gas over a surface of said plurality of flat tubes; and
a gas tight seal on each opposite extremity of each of said plurality of flat tubes adjacent to said inlet and said outlet opening for sealing said tube extremities from said gas flow channels.

* * * * *